United States Patent
Thantharate et al.

(10) Patent No.: US 11,792,711 B2
(45) Date of Patent: Oct. 17, 2023

(54) VOICE SIGNAL HANDOVER DURING VOICE OVER NEW RADIO SESSIONS

(71) Applicant: T-Mobile Innovations LLC, Overland Park, KS (US)

(72) Inventors: Anurag Thantharate, Overland Park, KS (US); Sreekar Marupaduga, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 146 days.

(21) Appl. No.: 17/539,435

(22) Filed: Dec. 1, 2021

(65) Prior Publication Data

US 2023/0171664 A1    Jun. 1, 2023

(51) Int. Cl.
*H04W 36/00* (2009.01)
*H04W 36/18* (2009.01)
*H04W 36/20* (2009.01)
*H04W 36/30* (2009.01)

(52) U.S. Cl.
CPC .......... *H04W 36/30* (2013.01); *H04W 36/18* (2013.01); *H04W 36/20* (2013.01)

(58) Field of Classification Search
CPC ..... H04W 36/30; H04W 36/18; H04W 36/20; H04W 24/02; H04W 36/00222; H04W 36/0027; H04W 36/04; H04W 36/28
See application file for complete search history.

(56) References Cited

U.S. PATENT DOCUMENTS

| | | | | |
|---|---|---|---|---|
| 11,277,775 | B2* | 3/2022 | Vikberg | H04L 65/1016 |
| 11,425,239 | B1* | 8/2022 | Rahman | H04M 3/2263 |
| 11,510,111 | B2* | 11/2022 | Cui | H04W 36/0055 |
| 11,621,982 | B1* | 4/2023 | Rahman | H04L 65/65 |
| | | | | 455/426.1 |
| 11,641,609 | B2* | 5/2023 | Mirza | H04W 36/30 |
| | | | | 370/280 |
| 2021/0136645 | A1* | 5/2021 | Zhao | H04W 36/0022 |
| 2022/0407896 | A1* | 12/2022 | Park | H04W 48/16 |
| 2023/0007128 | A1* | 1/2023 | Rahman | H04W 36/0022 |
| 2023/0036966 | A1* | 2/2023 | Agarwal | H04W 36/18 |
| 2023/0130540 | A1* | 4/2023 | Polaganga | H04W 36/08 |
| | | | | 370/331 |
| 2023/0171664 | A1* | 6/2023 | Thantharate | H04W 36/30 |
| | | | | 370/331 |

FOREIGN PATENT DOCUMENTS

WO    WO-2021261843 A1 * 12/2021
WO    WO-2022092897 A1 *  5/2022

* cited by examiner

*Primary Examiner* — Ahmed Elallam
(74) *Attorney, Agent, or Firm* — SHOOK, HARDY & BACON, L.L.P.

(57) ABSTRACT

Systems and methods are provided for improving quality and coverage of a VoNR session on a user device. When a user device is currently engaged in a VoNR session having a voice signal and a data signal, at least one KPI is monitored. The KPI is an indicator that can indicate the quality of the VoNR session, such as RSRP, RSRQ, SINR, or the like. A threshold for the KPI is determined. Once the threshold is met, a handover is initiated for the voice signal without initiating a handover for the data signal.

20 Claims, 5 Drawing Sheets

VOICE SIGNAL HANDOVER DURING VOICE OVER NEW RADIO SESSIONS

SUMMARY

The present disclosure is directed, in part, to improving the quality of certain Voice over Internet Protocol calls, such as Voice over New Radio (VoNR) calls. When a user device is involved in a VoNR call, at least one key performance indicator (KPI) associated with the VoNR session is monitored. As VoNR calls comprise a data signal and a voice signal, in aspects, the voice signal may experience a handover prior to the data signal. For instance, if the KPI, such as signal-to-noise ratio, has reached a predetermined threshold, the network may initiate a handover of the voice signal to a lower frequency band, or even to a different radio access technology, without initiating a handover at that time of the data signal.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, in 5G, when VoNR is being utilized by a user device, user devices stay on the 5G network, as the New Radio (NR) network carries the voice, video, and the data services. When the user device is mobile, the user device typically performs multiple handovers between RAT technologies, or between frequencies for consistent connectivity. In the ideal scenario, network operators would like to keep user devices that are subscribed to their particular carrier in 5GNR coverage as much as possible to move away from LTE, with the goal of providing users with better and faster 5G experience. With the introduction of VoNR, keeping user devices in 5G coverage becomes critical for reliable voice connectivity. But, issues may occur where carriers use both Sub-6 (FR1) and mmWave (FR2) spectrum for 5G deployment, and when the carriers deploy all of the frequencies for voice and data connectivity. The issue becomes more complex when there is a mix of low-band, mid-band, and high-band frequencies with FR1 deployment. This may present problems for carriers, and for network operators in particular when VoNR is deployed over these diverse frequencies.

VoNR and Voice over LTE (VoLTE) differ in many ways, as they are different access modes for IMS voice/video communication services. VoNR may have different ways of being deployed. Generally, when a user device moves to an area where the 5G signal is poor, a coverage-based handover may be needed. In this case, the user device may handover to the LTE network, such that VoLTE service is provided to the user device. EPS fallback (EPSFB) is one way that a user device may handover from 5G to LTE. This may occur on a 5G non-stand alone (NSA) scenario. 5G NSA architecture, also known as E-UTRA-NR dual connectivity, or EN-DC, is where 5G is deployed in conjunction with the existing LTE infrastructure. 5G stand alone (SA) architecture does not utilize any aspects of LTE. As 5G networks transition from NSA to SA, EPSFB is able to provide at least a temporary solution for VoNR until it is replaced with a full 5G VoNR.

A first aspect of the present disclosure is directed to method for improving coverage of a VoNR session. The method comprises determining that a user device is currently in a VoNR session in a wireless communications network, where the VoNR session comprises a voice signal and a data signal. The method further comprises monitoring at least one key performance indicator (KPI) associated with the VoNR session, determining a threshold for the at least one KPI, and upon the at least one KPI reaching the threshold, initiating a handover for the voice signal without initiating a handover for the data signal.

A second aspect of the present disclosure is directed to a system for improving coverage of a VoNR session. The system comprises one or more processors and one or more computer storage hardware devices storing computer-usable instructions that, when used by the one or more processors, cause the one or more processors to perform various method steps. The method steps include determining that a user device is currently in a VoNR session in a wireless communications network, where the VoNR session comprises a voice signal and a data signal. Further, the method steps include monitoring at least one KPI associated with the VoNR session, determining a threshold for the at least one KPI, and determining that the at least one KPI has met or exceeded the threshold. Even further, the method steps include, prior to initiating a handover for the data signal, initiating a handover for the voice signal from a first frequency band to a second frequency band.

According to another aspect of the technology described herein, a method is provided for improving coverage of a VoNR session. The method comprises determining that a user device is currently in a VoNR session, where the VoNR session comprises a voice signal and a data signal. The method further includes monitoring at least one KPI associated with the VoNR session, determining that one of the at least one KPI has met a corresponding predetermined threshold, and based on the one of the at least one KPI meeting the corresponding predetermined threshold, initiating a handover for the voice signal without initiating a handover for the data signal. The handover for the voice signal is from a first frequency band to a second frequency band, the first frequency band being higher than the second frequency band.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

Figure 1:
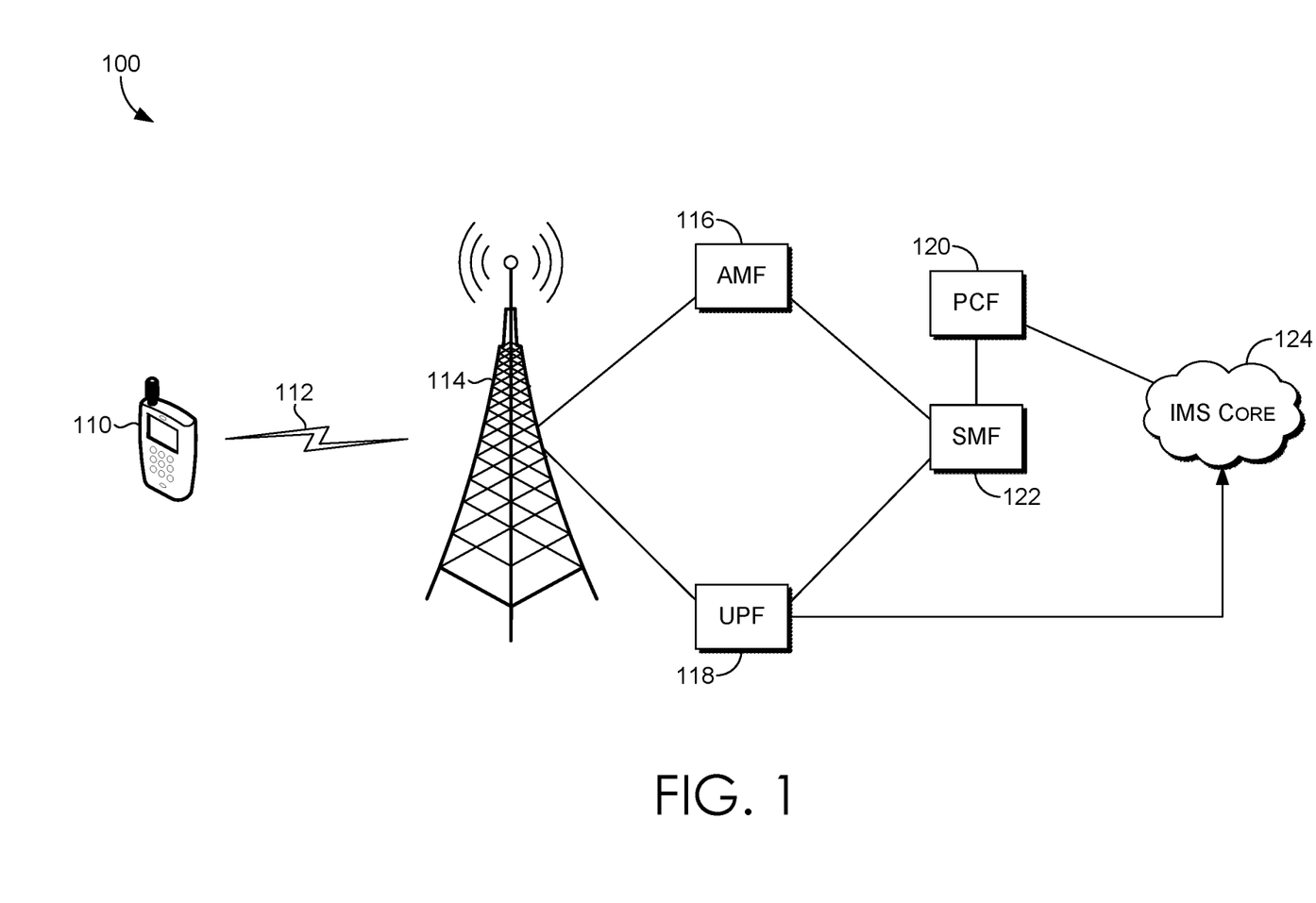
FIG. 1 depicts a diagram of an exemplary computing environment suitable for use in implementations of the present disclosure.

Turning now to FIG. 1, FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 provided service to one or more user devices, such as exemplary user device 110. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. (Example components and devices are discussed below with respect to FIG. 5.) Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through node 114. Node 114 may include one or more antennas, base transmitter stations, radios, transmitter/receivers, digital signal processors, control electronics, GPS equipment, power cabinets or power supply, base stations, charging stations, and the like. In this manner, node 114 may provide a communication link between the one or more user devices 110 and any other components, systems, equipment, and/or devices of the network environment 100 (e.g., the beam management system). The base station and/or a computing device (e.g., whether local or remote) associated with the base station may manage or otherwise control the operations of components of node 114. Example components that may control the operations of components of node 114 are discussed below with respect to FIG. 5.

Node 114 may include a Next Generation Node B (e.g., gNodeB or gNB) or any other suitable node structured to communicatively couple to the user device 110. Node 114 may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range or any other suitable wave properties.

In some embodiments, the user device 110 may take the form of a wireless or mobile device capable of communication via the network environment 100. For example, the user device 110 may take the form of a mobile device capable of communication via a telecommunication network such as, but not limited to, a wireless telecommunication network. In this regard, the user device 110 may be any mobile computing device that communicates by way of a network, for example, a 3G, CDMA, 4G, LTE, WiMAX, 5G, 6G or any other type of network. The network environment 100 may include any communication network providing voice and/or data service(s), such as, for example, a 1× circuit voice, a 3G network (e.g., Code Division Multiple Access (CDMA), CDMA 2000, WCDMA, Global System for Mobiles (GSM), Universal Mobile Telecommunications System (UMTS), a 4G network (LTE, Worldwide Interoperability for Microwave Access (WiMAX), High-Speed Downlink Packet Access (HSDPA)), or a 5G network.

In addition to user device 110 and node 114, network environment 100 includes communications link 112, AMF 116, UPF 118, PCF 12, SMF 122, and the IMS Core 124. In network environment 100, user device 110 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with node 114 in order to interact with a public or private network.

In some implementations, node 114 is configured to communicate with user devices, such as user device 110 and other devices that are located within the geographical area, or cell, covered by the one or more antennas of node 114. Node 114 may include one or more base stations, nodes, base transmitter stations, radios, antennas, antenna arrays, power amplifiers, transmitters/receivers, digital signal processors, control electronics, GPS equipment, and the like. In one aspect, node 114 is a gNodeB, while in another aspect, node 114 is an eNodeB. In particular, user device 110 may communicate with node 114 according to any of one or more communication protocols, in order to access the network.

When user device 110 is utilizing VoNR, node 114 may be in communication with several other network components, such as the AMF 116, UPF 118, PCF 120, SMF 122, and IMS Core 124. The Access and Mobility Management Function (AMF) is generally responsible for registration and connection management. The User Plane Function (UPF) is generally responsible for packet routing and forwarding, packet inspection, and also handles QoS. The Policy Control Function (PCF) assists to create and deploy policies in the 5G network. The 5G Session Management Function (SMF) is a fundamental element of the 5G architecture, in that it is responsible for interacting with the decoupled data plane, creating, updating, and removing Protocol Data Unit (PDU) sessions, and managing session context with the UPF. Together, along with other component not discussed herein, the 5G Core (5GC) works to establish reliable, secure connectivity to the network for user device, and provides access to its services. The IP Multimedia Subsystem (IMS) Core 124, in some aspects, is relied upon by VoNR sessions to manage the set up, maintenance, and release of voice call connections. Generally, IMS is used to provide an architectural framework for delivering IP-based multimedia services, and enables service providers to offer multimedia services over both circuit switched and packet switched networks. While the IMS Core 124 is illustrated in FIG. 1, in some aspects, it may not be used in its current form, but could be implemented as a virtual IMS. Additionally, only select components of the 5G and the VoNR architecture in general are illustrated in FIG. 1. The components illustrated are not meant to be limiting in any way, but are meant to illustrate just one potential network environment for VoNR.

Having described the network environment 100 and components operating therein, it will be understood by a person having ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by a person having ordinary skill in the art that the number, interactions, and physical location of components illustrated in FIG. 1 are examples, as other methods, hardware, software, components, and devices for establishing one or more communication links between the various components may be utilized in implementations of the present disclosure. It will be understood to a person having ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
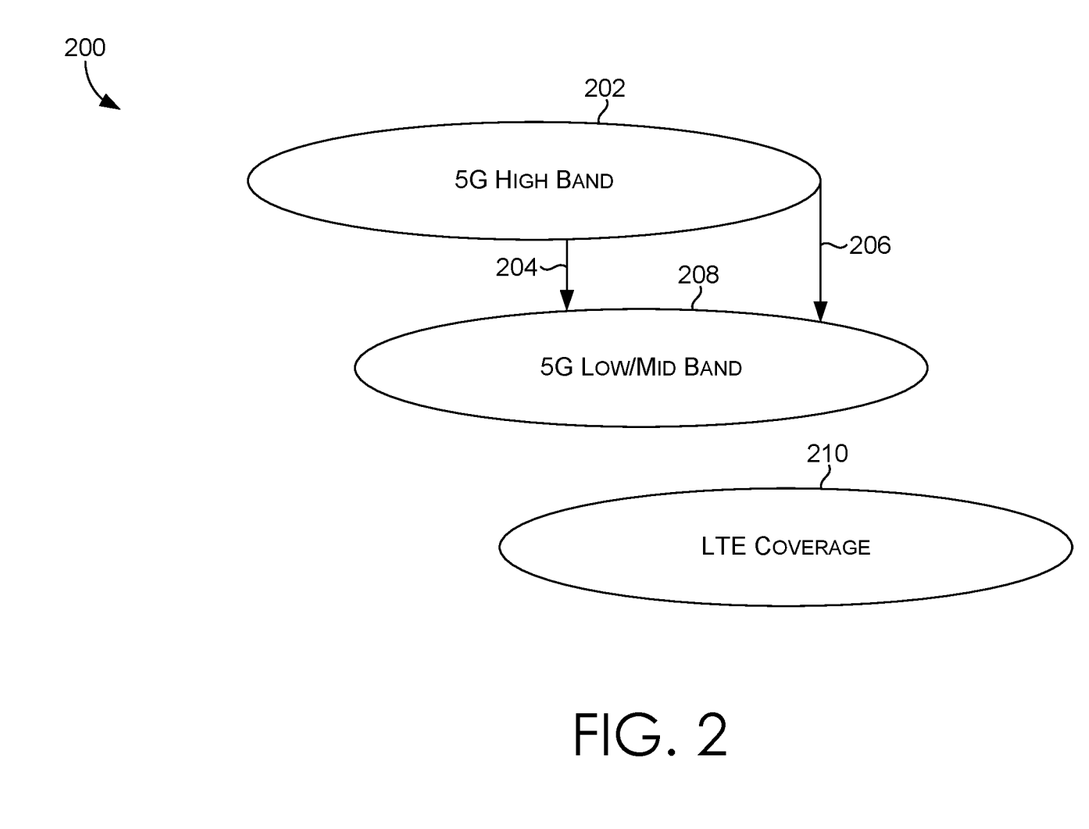
FIG. 2 depicts a diagram illustrating voice signal and data signal handovers to lower frequency bands, according to various aspects herein.

FIG. 2 illustrates a diagram 200 of voice signal and data signal handovers to lower frequency bands, according to various aspects herein. While it may be thought that voice signal and data signal handovers for VoNR need to occur at the same time, aspects herein provide for voice signals to handover prior to data signals used for a VoNR call. For example, the voice signal of 5G connectivity may handover from a high-band frequency to mid-band or low-band frequencies while maintaining the data signal on high frequencies. Keeping the data signal on high frequencies allows for higher download data rates for a longer period of time, while allowing for a smoother and cleaner voice experience on the low or mid-band frequencies. In some instances, this may be referred to as a partial handover (voice only), instead of a full handover (both voice and data).

As shown in FIG. 2, the 5G high-frequency band 202 initially supports a VoNR call by a user device. As shown here, band 202 is a 5G high frequency band, band 208 is a 5G low/mid frequency band, and band 210 represents LTE coverage. In FIG. 2, a user device is currently engaging in a VoNR call in band 202. Handover 204 represents a handover of a voice signal of the VoNR call, while handover 206 represents a handover of a data signal of the VoNR call. In an aspect herein, when a KPI threshold is reached during a VoNR call, handover 204 would occur prior to handover 206. As explained above, keeping the data signal on a high frequency band results in a better data experience for the VoNR call, while handing over the voice signal when a KPI threshold has been reached provides a smoother and cleaner voice experience. As used herein, handing over could be an inter-frequency handover (IFHO) to another 5G band (e.g., low/mid frequency band), such as from band 202 to band 208, or could be using Inter Radio Access Technology (IRAT) to handover from one radio access technology to another, such as from 5G to LTE (e.g., from band 208 to LTE coverage 210).

Figure 3:
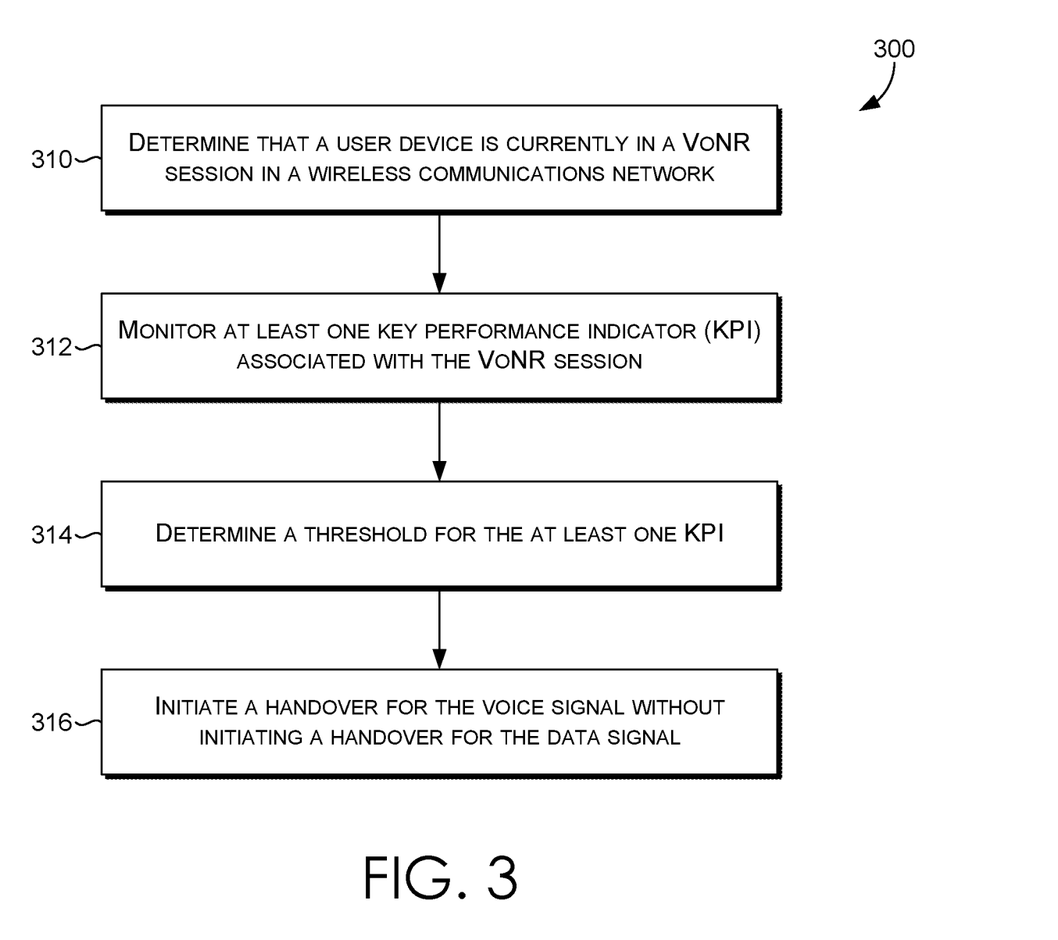
FIG. 3 depicts a flow diagram of an exemplary method for improving coverage of a VoNR session, in accordance with aspects herein.

Turning now to FIG. 3, a flow diagram of an exemplary method 300 is depicted for improving coverage of a VoNR session, in accordance with an aspect herein. At block 310, it is determined that a user device is currently in a VoNR session in a wireless communications network. As mentioned herein, VoNR is an IP Multimedia System (IMS) based voice calling service that uses the 5G network for its source of Internet Protocol voice processing. New Radio is the 5G radio access technology. At block 312, at least one KPI associated with the VoNR session is monitored. The KPI may be RSRP, RSRQ, SINR, or some other KPI that can be used to indicate a deteriorating quality of the voice signal portion of the VoNR session. At block 314, a threshold for the KPI is determined. This threshold could be predetermined, and be stored in a data store of the wireless communications network, or could be determined in real-time by, for example, the network operator. At block 316, a handover is initiated for the voice signal, based on the KPI reaching a threshold value. Here, while a handover is initiated for the voice signal, the data signal may not experience a handover at this time.

In some instances, because of the VoNR session, both the voice and data signals will initially be utilizing 5G technology, but because of one or more handovers occurring throughout the VoNR session, one or more of the voice or data signals could utilize LTE, for example, instead of 5G. As mentioned herein, the voice signal may first handover, while the data signal does not handover at that time. The handover for the voice signal could be IRAT (e.g., a handover from 5G to LTE) or IFHO (e.g., a handover from a high frequency band or a mid or low frequency band).

Figure 4:
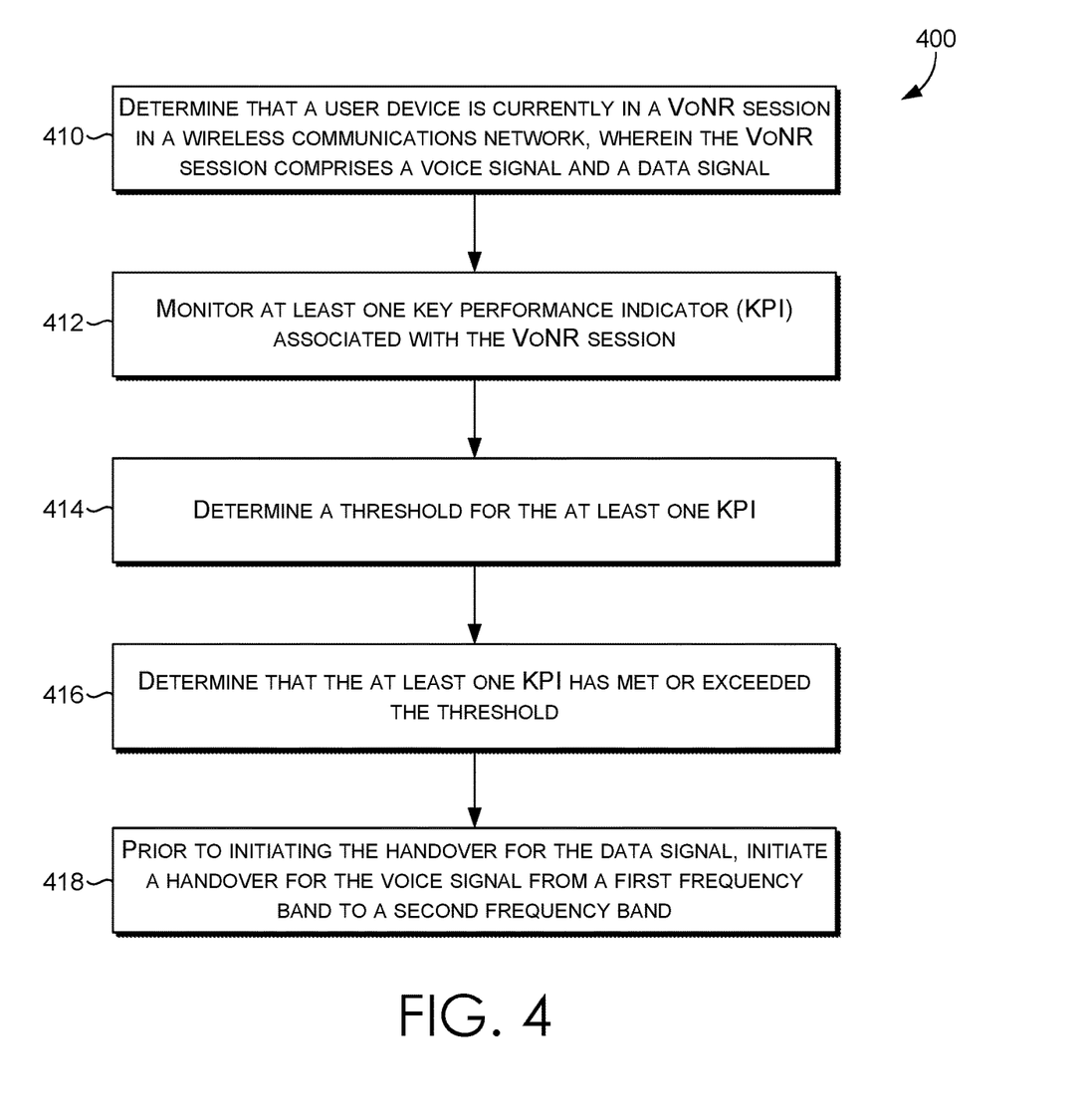
FIG. 4 depicts a flow diagram of an exemplary method for improving coverage of a VoNR session, in accordance with aspects herein.

Turning now to FIG. 4, a flow diagram of an exemplary method 400 is depicted for improving coverage of a VoNR session, in accordance with an aspect herein. At block 410, it is determined that a user device is currently in a VoNR session in a wireless communications network. The VoNR session comprises a voice signal and a data signal. At block 412, at least one KPI associated with the VoNR session is monitored. At block 414, a threshold for the KPI is determined. It should be noted that one KPI may be used, or multiple KPIs could be used. At block 416, it is determined that the KPI has met or exceeded the threshold. Prior to initiating the handover for the data signal, a handover is executed for the voice signal, where the handover, in an aspect, is from a first frequency band to a second frequency band, such as from a higher frequency band to a lower frequency band. As mentioned in reference to FIG. 3, the handover could be an IFHO or a IRAT handover. For example, the handover could be from a 5G higher frequency band to a 5G low or mid frequency band. Or, the handover could be from 5G to LTE.

During a VoNR session, aspects described herein allow for handovers for a voice signal without handovers for a data signal. While a handover for the data signal of the VoNR session may occur, in aspects, these handovers may occur after the voice signal handover. In some aspects, the voice signal may have a guaranteed bit rate that it must withhold, which is another reason the voice signal handover may occur prior to the data signal handover.

Figure 5:
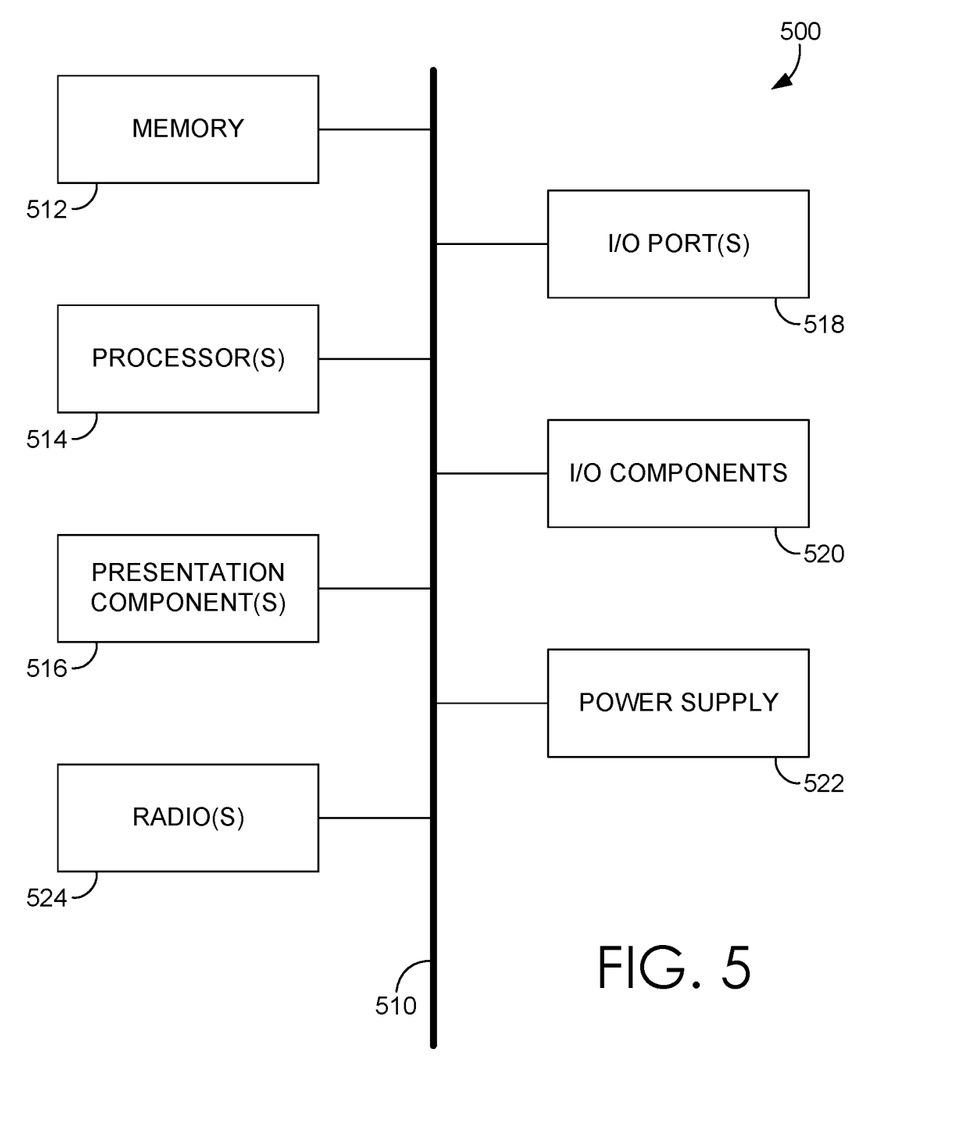
FIG. 5 depicts an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, U/O components 512, power supply 514, and radio 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RE infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below.

Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for improving coverage of a Voice over New Radio (VoNR) session, the method comprising:
    determining that a user device is currently in a VoNR session in a wireless communications network, wherein the VoNR session comprises a voice signal and a data signal;
    monitoring at least one key performance indicator (KPI) associated with the VoNR session;
    determining a threshold for the at least one KPI; and
    upon the at least one KPI reaching the threshold, initiating a handover for the voice signal without initiating a handover for the data signal.

2. The method of claim 1, wherein the voice signal utilizes 5G.

3. The method of claim 1, wherein the handover of the voice signal is an inter-radio access technology handover from a first radio access technology to a second radio access technology.

4. The method of claim 1, wherein the handover of the voice signal is an inter-frequency handover from a first frequency band to a second frequency band.

5. The method of claim 4, wherein the first frequency band is higher than the second frequency band.

6. The method of claim 1, wherein the at least one KPI comprises at least one of a reference signal received power (RSRP), a reference signal received quality (RSRQ), or a signal-to-noise ratio (SINR).

7. The method of claim 1, wherein determining the threshold for the at least one KPI further comprises accessing a data store in the wireless communications network to determine a predefined network threshold for the at least one KPI.

8. A system for improving coverage of a Voice over New Radio (VoNR) session, the system comprising:
    one or more processors; and
    one or more computer storage hardware devices storing computer-usable instructions that, when used by the one or more processors, cause the one or more processors to:
        determine that a user device is currently in a VoNR session in a wireless communications network, wherein the VoNR session comprises a voice signal and a data signal,
        monitor at least one key performance indicator (KPI) associated with the VoNR session;
        determine a threshold for the at least one KPI;
        determine that the at least one KPI has met or exceeded the threshold; and
        prior to initiating a handover for the data signal, initiate a handover for the voice signal from a first frequency band to a second frequency band.

9. The system of claim 8, wherein the first frequency band is higher than the second frequency band.

10. The system of claim 8, wherein the handover for the voice signal is an inter-frequency handover within a radio access technology.

11. The system of claim 8, wherein the handover of the voice signal is an inter-radio access technology handover from a first radio access technology to a second radio access technology.

12. The system of claim 8, wherein the handover is initiated for the voice signal without initiating a handover for the data signal.

13. The system of claim 8, wherein the voice signal corresponds to a guaranteed bit rate.

14. The system of claim 8, wherein determining the threshold for the at least one KPI further comprises accessing a data store in the wireless communications network to determine a predefined network threshold for the at least one KPI.

15. A method for improving coverage of a Voice over New Radio (VoNR) session, the method comprising:
    determining that a user device is currently in a VoNR session, wherein the VoNR session comprises a voice signal and a data signal;
    monitoring at least one key performance indicator (KPI) associated with the VoNR session;
    determining that one of the at least one KPI has met a corresponding predetermined threshold; and
    based on the one of the at least one KPI meeting the corresponding predetermined threshold, initiating a handover for the voice signal without initiating a handover for the data signal, wherein the handover for the voice signal is from a first frequency band to a second frequency band, the first frequency band being higher than the second frequency band.

16. The method of claim 15, wherein the voice signal utilizes 5G.

17. The method of claim 15, wherein the handover of the voice signal is an inter-radio access technology handover from a first radio access technology to a second radio access technology.

18. The method of claim 15, wherein the handover of the voice signal is an inter-frequency handover from a first frequency band to a second frequency band within a single radio access technology.

19. The method of claim 15, wherein the at least one KPI comprises at least one of a reference signal received power (RSRP), a reference signal received quality (RSRQ), or a signal-to-noise ratio (SINR).

20. The method of claim 15, wherein the voice signal corresponds to a guaranteed bit rate.

* * * * *